United States Patent
Oldendorf et al.

(10) Patent No.: US 6,373,237 B1
(45) Date of Patent: Apr. 16, 2002

(54) ELECTRONIC SCALE HAVING A SLEEP MODE IN ADDITION TO A STANDBY OPERATING MODE

(75) Inventors: Christian Oldendorf, Goettingen; Guenther Maaz, Uslar; Christoph Berg, Goettingen, all of (DE)

(73) Assignee: Sartorius Aktiengesellschaft, Goettingen (DE)

( * ) Notice: Subject to any disclaimer, the term of this patent is extended or adjusted under 35 U.S.C. 154(b) by 0 days.

(21) Appl. No.: 09/440,941

(22) Filed: Nov. 16, 1999

(30) Foreign Application Priority Data

Nov. 23, 1998 (DE) .......................... 198 53 892

(51) Int. Cl.[7] .......................... H03M 1/06; G01R 21/02
(52) U.S. Cl. .................... 324/105; 177/177; 177/25.13; 341/119
(58) Field of Search .............................. 177/177, 25.13; 324/105; 341/119

(56) References Cited

U.S. PATENT DOCUMENTS

| | | | | |
|---|---|---|---|---|
| 4,114,706 A | * | 9/1978 | Realini et al. ................. | 177/70 |
| 4,156,472 A | * | 5/1979 | Kunz ........................... | 177/25 |
| 4,364,442 A | * | 12/1982 | Flickinger ................... | 177/177 |
| 4,763,739 A | * | 8/1988 | Kasinoff .................. | 177/210 R |
| 5,207,284 A | * | 5/1993 | Douglas et al. ............. | 177/241 |
| 5,254,992 A | * | 10/1993 | Keen et al. ................. | 341/119 |
| 5,349,515 A | * | 9/1994 | Megeid ........................ | 363/21 |
| 5,426,579 A | * | 6/1995 | Paul et al. .................. | 363/126 |
| 5,563,781 A | * | 10/1996 | Clauter et al. .............. | 363/124 |
| 5,729,120 A | * | 3/1998 | Stich et al. ................. | 323/237 |

FOREIGN PATENT DOCUMENTS

| | | |
|---|---|---|
| DE | 29 22 848 | 12/1980 |
| DE | 2922848 C2 | 12/1980 |
| WO | WO 98/48498 | 10/1998 |

* cited by examiner

Primary Examiner—Safet Metjahic
Assistant Examiner—Vincent Q. Nguyen
(74) Attorney, Agent, or Firm—Sughrue Mion, PLLC

(57) ABSTRACT

Electronic scale including a line power voltage supply (5); a line switch (9); and a separate voltage supply (20), which is independent of the line powered voltage supply (5) and which supplies at least one clock module (22) with voltage. The scale has a normal operating state in which all the electronic components are supplied with voltage, a standby operating state in which the essential heat-generating components are switched on while components susceptible to deterioration over time and the display (3) are switched off and, in addition a further operating state (sleep mode) in which the line switch (9) is open. After expiry of a prescribed time and/or at a prescribed time of day, the clock module (22) automatically terminates the further operating state and switches over into the normal operating state or the standby operating state. This makes it possible to lower the energy consumption of the scale, which in the case of conventional electronic scales is scarcely less in the standby operating state than in the normal operating state. Specifically, the sleep mode according to the invention eliminates power consumption of the actual electronic system and also avoids all the power losses in the transformer and in the power supply unit.

21 Claims, 2 Drawing Sheets

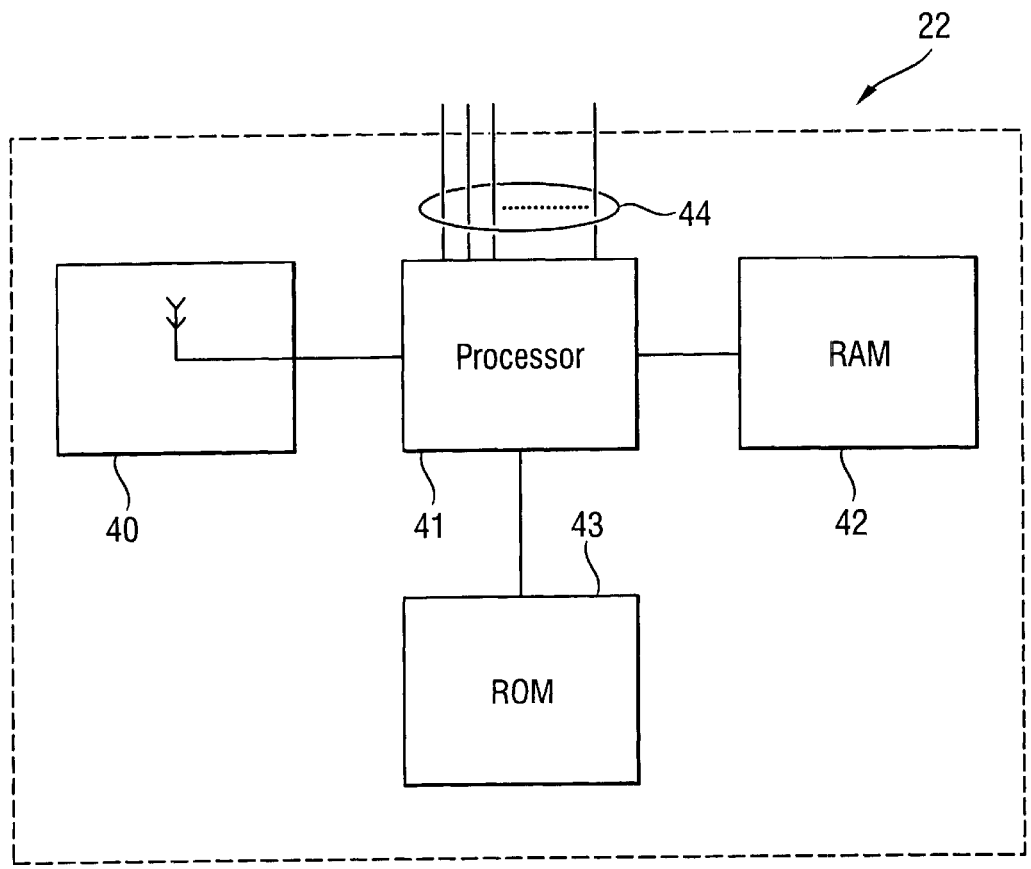

US 6,373,237 B1

ELECTRONIC SCALE HAVING A SLEEP MODE IN ADDITION TO A STANDBY OPERATING MODE

The following disclosure is based on German Application No. 19853892.8, filed on Nov. 23, 1998, which is incorporated into this application by reference.

FIELD OF AND BACKGROUND OF THE INVENTION

The invention relates to new and useful improvements in electronic scales. More particularly, the invention relates to electronic scales having a line powered voltage supply that preferably includes a transformer and a downstream rectifier and a charging capacitor. Such electronic scales also preferably have a line switch between the transformer and the power line connection, and have at least two operating states. Specifically, all the electronic components are supplied with voltage in the first, or normal, operating state. In the second or standby operating state, only the essential heat-generating components are switched on, while the display and components susceptible to deterioration over time are switched off.

Scales of this type are disclosed, for example, in the German Patent document DE 29 22 848 C2. According to this reference, the standby operating state serves the purpose of maintaining the approximate temperature distribution in the scales that exists in the normal operating state, while nonetheless switching off the display and those components that are susceptible to deterioration over time. The reason for this is to ensure that even immediately after the switchover from the standby operating state into the normal operating state, the scales operate with full accuracy, without the occurrence of deviations arising due to a substantially different temperature distribution inside the scales. This conventional art suffers from a disadvantage, however, in that the energy consumption during the standby operating state, although not being high, does add up to substantial values because of the long period of time in which the scales are usually operated in the standby operating state.

OBJECTS OF THE INVENTION

It is therefore an object of the invention to further reduce the energy consumption of electronic scales of the type mentioned above. It is a further object of the invention to reduce energy consumption while nonetheless avoiding the detrimental effects on the scale's accuracy that would result if the heat-generating components were switched off from the supply voltage during standby.

SUMMARY OF THE INVENTION

According to one formulation, the invention is directed to an electronic scale that includes a line powered voltage supply, a line switch, a display, a clock module, and a further, separate voltage supply. The line powered voltage supply has a transformer and, downstream from the transformer, a rectifier and a charging capacitor. The line switch is arranged between the transformer and an outlet to the line, and is an electrically operable switch. The scale has a normal operating state, in which all electronic components of the scale are supplied with voltage, and a standby operating state, in which heat-generating components are supplied with voltage while the display and other components susceptible to deterioration over time are not supplied with voltage. The separate voltage supply is independent of the line powered voltage supply and supplies the clock module with voltage. The scale has, in addition to the normal operating state and the standby state, a further operating state, in which the line switch is open. After expiration of a prescribed time or at a prescribed time of day, the clock module automatically terminates the further operating state and switches the scale over into the normal operating state or the standby operating state.

According to the invention, the objects of the invention are achieved by virtue of the line switch being an electrically operable switch, and a separate voltage supply is provided, which is independent of the line powered voltage supply and which supplies at least one clock module with voltage. In addition to the normal operating state and the standby state, there is provided a further operating state (a sleep mode) in which the line switch is open. After expiration of a prescribed time and/or at a prescribed time of day, the clock module automatically terminates the further operating state (the sleep mode) and switches over into the normal operating state or the standby operating state.

During the sleep mode, the normal electronic system of the scale is therefore completely disconnected from the main power grid, and the separate voltage supply keeps only a "minimal electronic system" in the form of a clock module functional, so that the normal line powered voltage supply is switched on again automatically after expiration of the prescribed time or at the prescribed time of day. The invention in this case utilizes the fact that most electronic scales are operated in a fixed temporal rhythm. It then suffices, for example, to terminate the sleep mode at some given time, e.g., 1.5 hours before the usual time that operation of the scales is begun. The scales then switch over into, for example, the standby operating state so that at the start of operation the scales have achieved their state of thermal equilibrium and thus their full accuracy. The separate voltage supply can advantageously consist of or include either a rechargeable energy storage mechanism (rechargeable battery or capacitor of high capacitance) or of a rectifier circuit, and a charging capacitor, which is connected directly to the two poles of the outlet to the power source via two capacitors.

BRIEF DESCRIPTION OF THE DRAWINGS

The invention and further advantageous refinements of the invention are described in more detail below with the aid of diagrammatic, exemplary embodiments in the drawing, in which:

FIG. 3 shows one embodiment of a processor configured to execute specific functions of an electronic scale according to the invention.

DETAILED DESCRIPTION OF THE PREFERRED EMBODIMENTS

Figure 1:
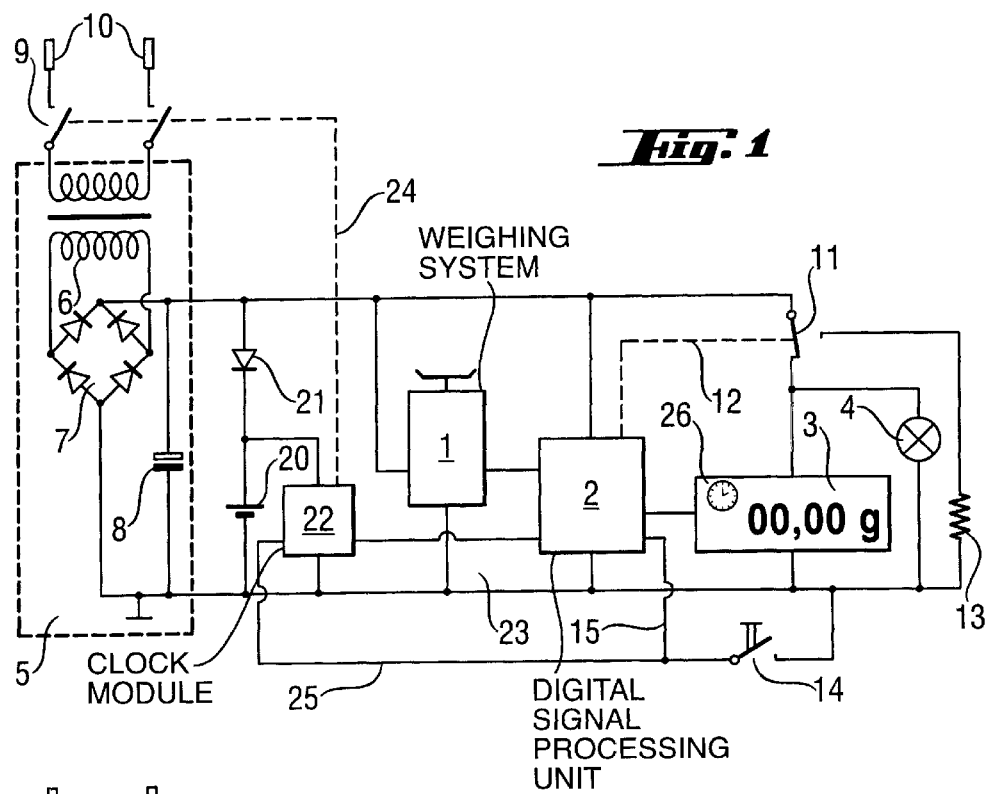
FIG. 1 shows a block diagram of an electronic scale according to a first embodiment of the invention.

The electronic scale in FIG. 1 includes a weighing system 1, a digital signal processing unit 2, which usually includes a microprocessor as the main element, and a display 3 with backlighting (indicated by the incandescent lamp 4). The voltage supply of the scale is provided by a power supply unit 5 which includes a transformer 6, a downstream rectifier 7 and a charging capacitor 8. A conventional circuit for voltage stabilization (not shown) can be connected downstream of the charging capacitor 8. The power supply unit (voltage supply) 5 is connected to the AC power source via a line switch 9 and via plug-in contacts (power line connection) 10. The scale also has a switch 11 which supplies voltage in the normal operating state (as illustrated in FIG. 1) to the display 3, to the backlighting 4 (incandescent lamp) and, if present, to other components susceptible to deterioration over time (not illustrated in the figure). In switching from the normal operating state to the standby operating state, the switch 11 is switched by a signal from the digital electronic signal processing system 2 and sent over the signal line 12. Specifically, switching the switch 11 causes the display 3 and the backlighting 4, etc. to be disconnected from the supply voltage and a substitute energy-consuming component 13 to be connected to the supply voltage instead. The substitute component 13 generates approximately as much heat as the disconnected components but exhibits no deterioration over time. As a result, the thermal equilibrium is maintained inside the scale in the standby operating state. The user of the scale brings about the switchover from the normal operating state to the standby operating state and vice versa by actuating a pushbutton 14, which is inscribed with "On/Off", for example, and which is connected to the digital signal processing unit 2 via the connecting line 15. The line switch 9 remains closed both in the normal operating state and in the standby operating state. The parts of the scale so far described, and their functions are generally known, and therefore explained above only very briefly.

The scale according to a first embodiment of the invention additionally has a separate voltage supply in the form of a rechargeable energy storage mechanism 20 which is denoted in FIG. 1 as a rechargeable battery, but which can also be a capacitor of high capacitance, Both in the normal operating state and in the standby operating state, the energy storage mechanism 20 is continuously recharged and/or kept charged via a charging circuit 21 (noted for simplicity as a diode in FIG. 1). The separate energy storage mechanism 20 supplies a clock module 22 with voltage. Here, a clock module is understood both as a module which has the time of day stored internally and which continuously updates the time, and/or as a module which, like a stopwatch, can count down a prescribed time interval to zero. The clock module 22 exchanges data with the digital signal processing unit 2 via the signal line 23, such that for example the digital signal processing unit 2 stores an "alarm time" in the clock module, or a time interval after the expiry of which the "alarm pulse" is to be triggered. As soon as a time of day for the alarm pulse or a time interval up to the alarm pulse has been stored by the digital signal processing unit 2 in the clock module 22, the clock module 22 passes a switch-off pulse to the line switch 9 via the line 24, with the result that the entire electronic system—with the exception of the clock module 22—receives no more supply voltage. This new operating state, called a sleep mode, is maintained until the prescribed time interval has elapsed or until the prescribed time of day is reached. Once this occurs, the clock module 22 passes a pulse to the line 24 and switches the line switch 9 on again. As a result, the digital signal processing unit 2 receives a supply voltage again and returns to an operational state. Preferably, the digital signal processing unit 2 is programmed such that it goes into the standby state after the supply voltage is switched on. In accordance with the mode of operation just described, the line switch 9 is a bistable switch which is respectively brought into its second switching state by a current/voltage pulse and maintains this switching state without a supply of energy.

The capacitance of the energy storage mechanism 20 is advantageously dimensioned such that the clock module operated for approximately 24 hours without needing to be recharged. The functionality of the clock module 22 is thereby ensured up to the following day for all scales which are used at least once every day.

According to one design, the user of the scale can, for example, permanently stipulate a desired switch-on time in a menu. In the case of an identical daily working time, the user programs a time which is 1–2 hours before operation starts. At this instant, the scale then switches over from the sleep mode described above into, e.g., the standby operating state, such that, within the 1–2 hours, the thermal equilibrium is reached inside the scale. The scale can thereby be switched over into the normal operating state when operation starts and be immediately available and operational without any impairment to its measuring accuracy.

Instead of stipulating the switchover instant by menu, it is also possible for the digital signal processing unit to be provided with a detector which detects rest and operating phases of the scale and stores this temporal sequence. These stored data can then be used to extrapolate future rest and operating phases, allowing the digital signal processing unit 2 to fix the instant for switching over from the sleep mode into the standby operating state 1–2 hours before the extrapolated start of operation. This design has the added advantage of providing an automated adaptation to gradually changing operating times.

The charging circuit 21 for the separate energy s storage mechanism 20 is expediently dimensioned such that the energy storage mechanism 20 is completely recharged again after approximately 2 hours. Together with a minimum time in the normal operating state, the lead-up time of 1–2 hours for reaching thermal equilibrium inside the scale then suffices to ensure the complete recharging of the energy storage mechanism 20.

The switchover between the various operating states is performed—with the exception of the automatic transition described above from the sleep mode into the standby operating state—by means of the pushbutton 14 by the user of the scales. The scale switches back and forth between the normal operating state and the standby operating state with each normal, short actuation of the pushbutton 14. If the pushbutton 14 is pressed for a long time, the digital signal processing unit 2 acknowledges this command, for example by the brief illumination of a clock symbol 26 in the display 3 or by displaying the stored "alarm time", and then switches over into the sleep mode. If an instant for automatically switching over from the sleep mode to the standby operating state is stored in the digital signal processing unit 2, the digital signal processing unit 2 can also switch on the sleep mode on its own accord if the scale has been in the standby operating state for a certain length of time—for example one hour.

If the scale is in the sleep mode, the digital signal processing unit 2 does not react to actuation of the pushbutton 14; in order to be able to switch over the scale from the sleep mode into the normal operating state again by hand, the pushbutton 14 is also connected to the clock module 22 via the signal line 25. Actuating the pushbutton 14 during the sleep mode therefore causes the clock module 22 to pass a pulse to the line 24 and thereby to switch over the scale into the standby operating state. The missing thermal equilibrium inside the scales is expediently signaled in this case to the operator, for example by the flashing of the abovementioned clock symbol 26 in the display 3. This warning indication is extinguished after the thermal equilibrium is reached—in other words after approximately one hour. Setting the thermal equilibrium can advantageously be accelerated by switching in further substitute, heat-generating components in addition to the substitute component 13 for an initial duration, or by switching on both the substitute component 13 and the display 3 and backlighting 4.

Switching over into the sleep mode by a long depression of the pushbutton 14 also serves to set the "alarm" time, i.e., the time at which the sleep mode should end. Specifically, as long as the pushbutton 14 is held pressed down, a time display—starting with the current time of day, for example—appears in the display 3 and is advanced in steps. When the desired "alarm" time is reached, the operator releases the pushbutton 14, thereby storing this time as the time when the scale should switch out of the sleep mode. The same holds analogously for storing a period of time defining the duration of the sleep mode.

The clock module 22 advantageously additionally includes a voltage monitoring circuit. In the sleep mode, this circuit monitors the voltage of the energy storage mechanism 20 and outputs a pulse on the line 24 if the voltage of the energy storage mechanism 20 drops below a prescribed limiting value. In such event, the line switch 9 is switched on, and the energy storage mechanism 20 is recharged. After a prescribed time—the recharging time for the energy storage mechanism 20—the clock module 22 once again passes a pulse to the line 24 and thereby switches the line switch 9 off again if in the meantime the programmed "alarm" time is not yet reached. As such, even in the case of a lengthy separation of the scale from the main power grid, the voltage monitoring circuit ensures that the scale is again probably able to enter the standby operating state following re-connection to the power line. Specifically, if the scale is separated from the main power supply in the sleep mode, it remains in the sleep mode until the voltage monitoring circuit detects the undershooting of the prescribed limiting value for the voltage of the energy storage mechanism 20, and switches on the line switch 9. Admittedly, this does not lead to recharging of the energy storage mechanism 20, but it does ensure that, upon reconnection to the main power supply, the line switch 9 is switched on and the scale starts operating via the normal voltage supply 5. Since the voltage monitoring circuit is activated only in the sleep mode, if a separation from the main power supply occurs in the standby operating state or occurs in the normal operating state followed by a voltage drop at the energy storage mechanism 20, no switchover pulse is passed to the line switch 9, and the latter remains switched on.

In another advantageous refinement, the clock module 22 includes a radio clock receiver (see reference 40 in FIG. 3), with the results that the internal time of day is always exact and that the summer/winter time is reset automatically.

If the digital signal processing unit 2 includes a microprocessor whose power consumption is sufficiently low, it is, of course, possible for the clock module 22 to be a component of this microprocessor, and for the entire microprocessor to be kept in a standby state during the sleep mode. There is nevertheless, during the sleep mode, a reduction in power consumption in comparison with the standby operating state, since the further electronic components of the digital signal processing unit 2 and of the weighing sensor 1, and the substitute component 13 and the power supply unit 5 consume no power.

Overall, the circuit according to the invention and the introduction of a sleep mode as a further operating state lead to a substantial reduction in the power consumed: the full power consumption which is required in accordance with the prior art not only in the normal operating state, but also in the standby operating state, due to the substitute component, is required in accordance with the invention only during the normal operating state and during a preceding warmup time of, e.g., approximately 1–2 hours. During all other times, virtually all the powered components, including the transformer and the power supply unit, are switched off and no power of any sort is consumed from the public power grid. Operation of the clock module 22 not only ensures switching over to the standby operating state at the prescribed time but also maintains the ability to switch on by hand. This clock module is operated by a separate, rechargeable energy storage mechanism. This energy storage mechanism must, admittedly, be recharged during the normal operating state and the standby operating state, with the result that the power consumption of the clock module 22 must be extracted from the public power grid. However, the entire power losses of the transformer, power supply unit, etc. during the sleep mode are eliminated.

Figure 2:
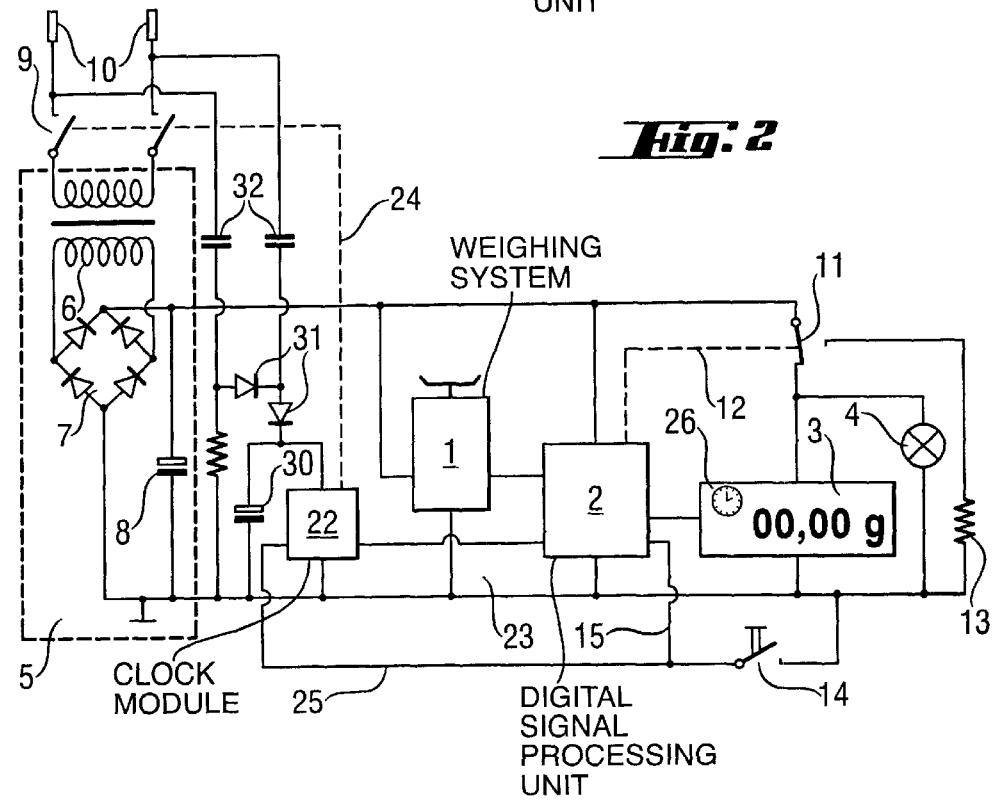
FIG. 2 shows a block diagram of an electronic scale according to a second embodiment of the invention.

The block diagram of a second embodiment of a scale according to the invention is shown in FIG. 2. The components 1 . . . 15 and 22 . . . 26 are identical to the corresponding components from FIG. 1, and are therefore not explained again. Provided in FIG. 2 as a separate voltage supply independent of the normal voltage supply 5 is a rectifier circuit 31 which has a separate charging capacitor 30 and is connected directly to the two poles of the outlet 10 via two capacitors 32. The two capacitors 32 ensure that the frame potential of the circuit is disconnected from the potential of the main power supply. It is possible to provide a voltage stabilization circuit downstream of the charging capacitor, e.g., if the clock module 22 requires this, but for the sake of simplicity it is not illustrated in FIG. 2.

Even though this primitive circuit without transformer is not good in terms of efficiency, because of the very low current requirement of less than 1 mA for the clock module 22, the losses of this circuit are nonetheless smaller than the losses of the power supply unit 5 which, after all, is dimensioned for a substantially higher nominal power. The higher current required briefly for switching over the line switch 9 is applied in this case by the storage capacity of the charging capacitor 30. Otherwise, the mode of operation of this circuit is identical to the mode of operation, already described, of the circuit in accordance with FIG. 1. The power consumption of this circuit is certainly not quite zero in the sleep mode, but is nevertheless very low, and substantially lower than in the standby operating state, given an appropriate technology for the clock module 22.

The various functions described above for the clock module 22 are expediently embodied in a single processing arrangement such as that illustrated in FIG. 3. The functions of the microprocessor 2 may be embodied in a similar processing arrangement. The hardware associated with such a processing arrangement includes a processor 41, a random access memory 42, a read-only memory 43, and various signal lines 44 allowing the processor 41 to communicate with other, previously described components, such as the pushbutton 14, the display 3, the voltage supply 5, the switch 9, etc. As noted earlier, the scale is advantageously provided with a radio clock receiver 40, which is either associated with the clock module 22 or incorporated into the module 22. The hardware is programmed with appropriate software code stored in the ROM 43 and provided with various operating data stored in the ROM 43, the RAM 42, or both. The software executes various algorithms, to perform, inter alia, the functions described in detail above. Thus, by way of example, the processing arrangement 22 is programmed to store the prescribed time of day at which the sleep mode should terminate as well as to receive, via the pushbutton 14, a user command to alter the prescribed time of day. The processing arrangement can also be programmed to provide an advanced function whereby, as described above, the rest phases of the scale are monitored and recorded. This, in turn, provides data for the processor to extrapolate future rest and operating phases for the scale, and thereby automatically calculate the appropriate time at which the scale should revert to the standby mode and bring the electrical components of the scale to the working, steady-state temperature.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. An electronic scale, comprising:
   a line powered voltage supply;
   a line switch arranged between said voltage supply and an outlet to the line, wherein said line switch is an electrically operable switch;
   wherein the scale has a normal operating state, in which each of a plurality of electronic components of the scale is supplied with a first voltage from the line powered voltage supply, and a standby operating state, in which first ones of the plurality of components are supplied with the first voltage while second ones of the plurality of components are not supplied with the first voltage; and
   wherein the scale further comprises:
      at least one clock module;
      a separate voltage supply that is independent of said line powered voltage supply and that supplies said clock module with a second voltage;
      wherein the scale has, in addition to the normal operating state and the standby state, a further operating state, in which said line switch is open; and
      wherein, after expiration of a prescribed time or at a prescribed time of day, said clock module automatically terminates the further operating state and switches the scale into the normal operating state or the standby operating state by closing said line switch.

2. The electronic scale as claimed in claim 1, wherein:
   said separate voltage supply comprises a rectifier circuit with a charging capacitor; and
   the electronic scale further comprises two capacitors connecting said rectifier circuit respectively to the two poles of the outlet to the line.

3. The electronic scale as claimed in claim 1, wherein said line switch is a bistable switch.

4. The electronic scale as claimed in claim 1, wherein said clock module comprises a radio clock receiver.

5. The electronic scale as claimed in claim 1, further comprising a processing arrangement that includes a microprocessor and said clock module.

6. The electronic scale as claimed in claim 1, wherein:
   said clock module comprises a memory storing the prescribed time of day for automatically terminating the further operating state; and
   the scale further comprises an input device transferring a value for the prescribed time of day, entered by a user, to said memory.

7. The electronic scale as claimed in claim 1, further comprising:
   a digital signal processing unit comprising:
      a detector detecting at least one of the further operating state, the normal operating state and the standby operating state of the scale;
      a memory recording a duration of at least one of the further operating state, the normal operating state and the standby operating state as stored rest and operating phases; and
      a processor programmed to extrapolate future rest and operating phases from the stored rest and operating phases, and to control said clock module to automatically terminate the further operating state and switch the scale over into the standby operating state.

8. The electronic scale as claimed in claim 1, wherein said line powered voltage supply comprises:
   a transformer, and
   a rectifier and a charging capacitor arranged downstream from said transformer; and
   wherein said line switch is arranged between said outlet to the line and said transformer.

9. The electronic scale as claimed in claim 1, wherein
   said first components comprise components that generate heat when supplied with the first voltage; and
   said second components comprise components susceptible to deterioration over time.

10. The electronic scale as claimed in claim 9, wherein
    said components that generate heat comprise a substitute energy-consuming component; and
    said components susceptible to deterioration over time comprise at least one of a display and a backlighting.

11. The electronic scale as claimed in claim 1, wherein said separate voltage supply comprises a rechargeable energy storage mechanism.

12. The electronic scale as claimed in claim 11, wherein said rechargeable energy storage mechanism is a capacitor of high capacitance.

13. The electronic scale as claimed in claim 11, wherein said rechargeable energy storage mechanism is a rechargeable battery.

14. The electronic scale as claimed in claim 11, further comprising:
    a voltage monitoring circuit;
    wherein said voltage monitoring circuit monitors a charge state of said rechargeable energy storage mechanism;
    wherein said rechargeable energy storage mechanism supplies said voltage monitoring circuit with voltage; and
    wherein the further operating state is interrupted whenever the monitored charge state is inadequate and at least until the monitored charge state becomes adequate.

15. The electronic scale as claimed in claim 11, wherein said line powered voltage supply re-charges said rechargeable energy storage mechanism both during the normal operating state and during the standby operating state.

16. The electronic scale as claimed in claim 15, further comprising:
    a voltage monitoring circuit;
    wherein said voltage monitoring circuit monitors a charge state of said rechargeable energy storage mechanism;

wherein said rechargeable energy storage mechanism supplies said voltage monitoring circuit with voltage; and wherein said line powered voltage supply recharges said rechargeable energy storage mechanism whenever the monitored charge state is inadequate and at least until the monitored charge state becomes adequate.

17. An electronic scale, comprising:

a first voltage source;

a first set of operational components powered by said first voltage source;

a second set of operational components powered by said first voltage source;

a first switch connecting or disconnecting said first voltage source to or from an external voltage supply in accordance with a signal state of a first electrical signal;

a second switch connecting or disconnecting said first set of operational components to or from said first voltage source in accordance with a signal state of a second electrical signal;

a second voltage source; and a clock module electrically powered by said second voltage source and controlling at least said first switch by outputting the first electrical signal in accordance with a stored timing parameter.

18. The electronic scale according to claim 17, wherein:

said first set of operational components comprises components susceptible to deterioration over time; and said second set of operational components comprises components that generate heat when powered by said first voltage source.

19. The electronic scale according to claim 17, further comprising an input device controlling at least said second switch by supplying the second electrical signal in accordance with a command input by a user.

20. An operational method for an electronic scale, comprising:

supplying an operational voltage to a first set of electrical components of the scale and to a second set of electrical components of the scale in a normal operational mode;

disconnecting the operational voltage from the first set of electrical components in a standby mode of the scale;

disconnecting the operational voltage from the first set of electrical components and from the second set of electrical components in a sleep mode of the scale;

supplying a stored voltage to a third set of electrical components in at least the sleep mode; and utilizing the third set of electrical components to automatically reconnect the operational voltage to at least the second set of electrical components after a predetermined time.

21. The operational method according to claim 20, wherein:

the first set of operational components comprises components susceptible to deterioration over time; and the second set of operational components comprises components that generate heat when powered by said first voltage source.

* * * * *